United States Patent
Trinkel et al.

(10) Patent No.: US 8,345,708 B2
(45) Date of Patent: Jan. 1, 2013

(54) METHOD AND SYSTEM FOR INCREASING THE SWITCHING CAPACITY IN TELECOMMUNICATIONS NETWORKS BY TRANSMISSION OR ACTIVATION OF SOFTWARE

(75) Inventors: Marian Trinkel, Untermaubach (DE); Frank Bindel, Koenigswinter (DE); Frank Daussmann, Hassloch (DE)

(73) Assignee: Deutsche Telekom AG, Bonn (DE)

( * ) Notice: Subject to any disclaimer, the term of this patent is extended or adjusted under 35 U.S.C. 154(b) by 1396 days.

(21) Appl. No.: 10/563,017

(22) PCT Filed: Jun. 8, 2004

(86) PCT No.: PCT/DE2004/001187
§ 371 (c)(1),
(2), (4) Date: May 24, 2006

(87) PCT Pub. No.: WO2005/009058
PCT Pub. Date: Jan. 27, 2005

(65) Prior Publication Data
US 2007/0011286 A1   Jan. 11, 2007

(30) Foreign Application Priority Data
Jun. 26, 2003 (DE) .................................. 103 28 661

(51) Int. Cl.
*H04L 12/28* (2006.01)
*H04J 3/16* (2006.01)

(52) U.S. Cl. ........................................ 370/465; 370/400

(58) Field of Classification Search .................. 370/229; 709/224
See application file for complete search history.

(56) References Cited

U.S. PATENT DOCUMENTS

| | | | |
|---|---|---|---|
| 4,799,253 A | 1/1989 | Stern et al. | |
| 5,761,380 A | 6/1998 | Lewis et al. | |
| 5,951,633 A | 9/1999 | Polcyn | |
| 6,128,738 A * | 10/2000 | Doyle et al. | 713/185 |
| 6,175,552 B1 * | 1/2001 | Parry et al. | 370/216 |
| 6,885,874 B2 * | 4/2005 | Grube et al. | 455/520 |
| 2003/0133407 A1 * | 7/2003 | Segev et al. | 370/229 |
| 2004/0010588 A1 * | 1/2004 | Slater et al. | 709/224 |

FOREIGN PATENT DOCUMENTS

| | | |
|---|---|---|
| DE | 10204300 A1 | 8/2003 |
| DE | 10238546 A1 | 3/2004 |
| EP | 0676734 A1 | 10/1995 |
| EP | 0964334 A2 | 12/1999 |
| WO | 9722054 * | 12/1995 |
| WO | WO 97/22054 | 6/1997 |
| WO | WO 00/68914 A1 | 11/2000 |

* cited by examiner

*Primary Examiner* — Mark Rinehart
*Assistant Examiner* — Angel Brockman
(74) *Attorney, Agent, or Firm* — Kenyon & Kenyon LLP

(57) ABSTRACT

A method and system for running and/or organizing at least one telecommunications network is provided. A software for organizing and/or carrying out the switching of telecommunications connections and/or services is run down by a central server of the telecommunications network. When the switching capacity of the switchboards is not sufficient, the software may be transmitted at least temporarily to at least another server of another selectable telecommunications network and/or is activated in said server at least temporarily. This may be effected in order to increase the transmission capacity.

10 Claims, 2 Drawing Sheets

METHOD AND SYSTEM FOR INCREASING THE SWITCHING CAPACITY IN TELECOMMUNICATIONS NETWORKS BY TRANSMISSION OR ACTIVATION OF SOFTWARE

FIELD OF INVENTION

The present invention relates to a system and method for operating and/or organizing at least one telecommunications network, in which software for implementing a service and/or for organizing and/or implementing the switching of telecommunications connections is running in a central server of the at least one telecommunications network.

BACKGROUND

In view of today's digitalization of the telecommunications technology, so that—referring to a telephone network by way of example—call switching between two call parties is usually implemented digitally and on the basis of software. Such software is often not only able to establish a connection between two communication parties, but possibly provide other services as well, such as automatic announcements and the receiving of messages, for instance in the case of network-internal answering machines.

With available methods, corresponding software for organizing and/or implementing switching operations or services, for example, is running in an individual switching center of a telecommunications network, it being possible for a telecommunications network of a network provider to have a plurality of switching centers which cover assigned regional territories, for example.

Furthermore, it is known that switching bottlenecks may occur if a switching center that is part of the own network, for instance, has insufficient switching capacity; that—once again with reference to the telephone network—a dialed connection cannot be established or a desired service not offered since the particular switching center has exhausted its capacity.

Insufficient switching capacity may arise under a variety of circumstances. On New Year's Eve, for instance, it may happen that millions of people attempt to reach their friends and relatives at the stroke of midnight to convey best wishes for the new year. Due to this increased simultaneous telecommunications demand the dialed call party or a service can frequently not be reached for lack of sufficient switching capacity, and only a busy signal or a some corresponding announcement will be heard.

Increased telecommunications demand may also come about in other conceivable situations, such as in general around holidays, with media events that call for participation via the phone, or else also in dangerous situations such as in emergencies when a large number of people tries to reach emergency assistance providers or relatives at the same time or when a large group of people is to be notified, for instance in the case of major fires or accidents.

SUMMARY OF INVENTION

Embodiments of the present invention provide a method and a system by which an overall sufficient switching capacity is able to be ensured even in situations of increased telecommunications activity.

Embodiments of the present invention provide that, in the event of insufficient switching capacity of a network-owned switching center, software is at least intermittently transmitted to at least one additional server of at least one additional switching center, in particular a selectable telecommunications network—of an otherwise competing network provider, for instance—, and/or software that is already available in such a switching center is activated, in particular in order to increase the switching capacity so as to be able to transmit messages in a selective and large-scale manner.

Using the mentioned method, it can therefore be ensured that in the event of insufficient switching capacity, a copy of the software of the switching center having insufficient capacity or else also any other software for implementing the organization and/or the switching of telecommunications connections or other services is transmitted to other switching centers, which are basically available both in the telecommunications network of the affected network provider and in telecommunications networks of different network providers.

It is likewise possible for such software to be already installed in other switching centers, in particular those of other network providers, which must merely be activated in order to obtain the switching capacities of this switching center.

Notwithstanding the fact that all switching centers in telecommunications networks are basically equipped with corresponding software for organizing and implementing connections, the method according to the present invention is used specifically in the transmission/activation of special software that, for instance, assumes expanded tasks or services that go beyond the usual connection tasks.

For instance, this may be software that ensures in exceptional situations, for example in emergencies where dangerous situations arise or also in the defense of a country, that a large number of people is reached by a particular message in a minimum of time.

This may be software, for example, which in the case of a fire automatically informs the population of the surrounding area via a telecommunications network such as the telephone network, by e-mail, via the Internet, the mobile radio network, or also via radio or radio broadcasts, to the effect that, for instance, windows are to be closed or other instructions followed. With the aid of such software, it is also possible to answer incoming calls from concerned citizens and to transfer these calls at a later time. A method for implementing such services with the aid of software may be described, for example, in German Patent Reference DE 102 04 300.

It may also involve an application case where generally any type of large-scale notification is to be implemented with the aid of software. In a defense situation, for example, at the request of government departments, it is possible with the aid of such software for organizing and implementing switching operations of telecommunications connections to alert and mobilize all soldiers and reserves via a specific message in a minimum of time.

According to the method of the present invention, it may be provided that, after transmission and/or activation, such software will run simultaneously on a plurality of servers of switching centers of a telecommunications network or different telecommunications networks, for instance, of different network providers, or that software runs only on one server of a selected telecommunications network having sufficient switching capacity. In a corresponding manner, if insufficient switching capacity of an affected switching center is determined, this software or some other software may be transmitted to other switching centers by the software itself or also, for instance, upon instructions initiated from the outside, or software already available in such a switching center for such an eventuality may be activated, so that an overall sufficient switching capacity for implementing a large-scale alarm, for instance, is achieved.

In embodiments of the present invention, it may be provided that prior to the transmission/activation of software to/in one or a plurality of other switching centers or to/in one or a plurality of other telecommunications networks, the activity prevailing or the switching capacities available in this telecommunications network is/are queried. In this way it may be ensured that software will be transmitted to or activated in only such switching centers or such telecommunications networks that are also able to increase the switching capacity significantly.

The selection of an additional switching center or an additional telecommunications network may be made while taking various aspects into account. For example, the selection may be made on the basis of the available switching capacity and/or according to a quota/priority key, so that the increase in the switching capacity by adding additional capacities of other network providers, for instance, does not cause any unfairness or disadvantages for these network providers or that such effects are at least controlled.

Since it may happen that the software that was originally intended for the organization and implementation of switching operations of a switching center and which includes the services implemented therein, such as the large-scale notification, is unable to run in the switching centers of other network providers in the specific version of this switching center in view of the operating system, for example, different versions may be stored by a software operating a specific service, such as the one mentioned above, so that a correspondingly selected and adapted software version is able to be transmitted to another switching center in these cases, for instance a switching center of another selected telecommunications network, it then being ensured that this software with its implemented functions is able to run in this switching center or its server. This may not occur if software that merely needs to be activated is already available in other switching centers, since this software is adapted to the particular switching center.

To simplify and automate such transmissions or activations, embodiments of the present invention may provide that in the event of insufficient switching capacity, this switching center or its server or some other center having proper authorization may transmit one or a plurality of software packages to one or a plurality of telecommunications networks, such transmission taking place simultaneously, for example.

For a transmission of software, it may be provided in embodiments that different versions of a particular software are available in such a software package, so that a respective matching version is automatically selected from the software package and installed upon transmission to a particular switching center. If only an activation is to occur, it will be sufficient to transmit together with the software package at least one activating trigger software in order to activate the software available in the switching centers by a trigger command. Such trigger software may be the same for all switching centers or it may be selected in a center-specific manner.

In this context, it may be provided that a software package of the two aforementioned alternatives represents a program or macro that transmits itself over and over, so that it propagates across one or a plurality of telecommunications systems quasi automatically, like an avalanche. To this end, such a software package may include a list of all switching centers to be triggered, with the aid of their specific network identification codes, for instance, so that a selective transmission of the software packages may be implemented to the addresses of these switching centers where the transmission or activation takes place.

Such a software package may also carry additional data, such as messages that are to be sent with such an alert or large-scale notification, the target addresses, or also only the indication of a region for which target addresses to which messages must be sent are still to be determined.

In embodiments of the present invention, a plurality of software packages may transmit to the telecommunications networks. The plurality of software packages, whose number corresponds to the number of switching centers to be reached, for instance, upon arrival at a switching center, a software package automatically installs therein an executable software version, or activates the software available therein, marking this switching center as covered by the software following the installation/activation, so that additional software packages possibly arriving at this occupied switching center are automatically refused and diverted, until all software packages transmitted to one or a plurality of telecommunications networks have found and occupied a free switching center.

If it is determined, for example, that the switching capacity of a switching center is insufficient and that capacities of ten additional switching centers are required, it would be sufficient according to the above-described embodiment(s) to transmit ten software packages to one or a plurality of telecommunications networks, these automatically occupying ten free available switching centers until all software packages have found a switching center.

In embodiments of the present invention, it may be provided that such software carries out an automatic notification of at least one group of people, for example, so as to put out an alert in dangerous situations, via a fixed network, a mobile telephone, the Internet, via e-mail, web radio or other services, for example.

In emergency or other critical cases, for example, when raising an alarm in dangerous situations, or in the call-up of soldiers via government departments, it may be provided that during normal operation, i.e., prior to a required transmission, software intended for this purpose is stored only in a server of a central location, such as a certified trust center, so that security aspects possibly associated with the software will not be jeopardized under any circumstances. Only in certain exceptional situations, e.g., where a switching capacity made available by such a trust center is insufficient in the event of a required large-scale alert, may it be provided that such software leave the central location such as the trust center or is activated in other switching centers, for example, by the aforementioned types of circulation, to then also run, at least intermittently, also in other switching centers in order to manage the emergency situation.

In embodiments of the present invention, such a central location may also ensure that software that may be available in other switching centers and must merely be activated, will be serviced and maintained, i.e., is always available in the latest version.

Furthermore, if software of the mentioned type occupies other switching centers only intermittently or is activated intermittently, it may additionally be provided that software which has occupied a switching center automatically de-installs or deactivates itself again after a specific period of time and returns the switching capacities to the switching center. It may likewise be provided that the release/deactivation of occupied switching centers is initiated from the outside, for example, once again by transmission of one or a plurality of software package(s), which coordinate(s) and implement(s) the de-installation/deactivation of the previously transmitted software.

According to embodiments of the present invention, for example, with software for implementing the switching to at least one particular group of persons, it may be provided that such software accesses a portability database having network-spanning network identification codes of these persons to be switched or notified, or otherwise also that the software accesses the individual network-internal databases of some other selected telecommunications network provider, for example.

In embodiments of the present invention, if the software itself does not have an internal database, this ensures that it always obtains sufficient information about the network identification codes of persons or network connections to be reached, by accessing globally available databases or the databases of the particular network provider.

For example, in a dangerous situation it may be necessary to reach all people in a particular area of town. To this end, the software may access the mentioned databases in order to ascertain which persons are registered in this region, and by which network identification code (mobile number, fixed network, e-mail, etc.). The network identification codes may be loaded automatically, and automatically generated messages or predefined information, for example, may be transmitted to these network identification codes.

Embodiment methods of the present invention may be implemented using a system that includes at least one telecommunications network having a server on which software for implementing and/or organizing switching operations or services is running, the system ensuring that, in the event of insufficient switching capacity of a network of the own switching center, for example, this software or some other software is transmittable, at least intermittently, to at least one additional server of at least one additional selectable telecommunications network, possibly also of the same network, in order to increase the capacity of the switching operations.

DETAILED DESCRIPTION

Figure 1:
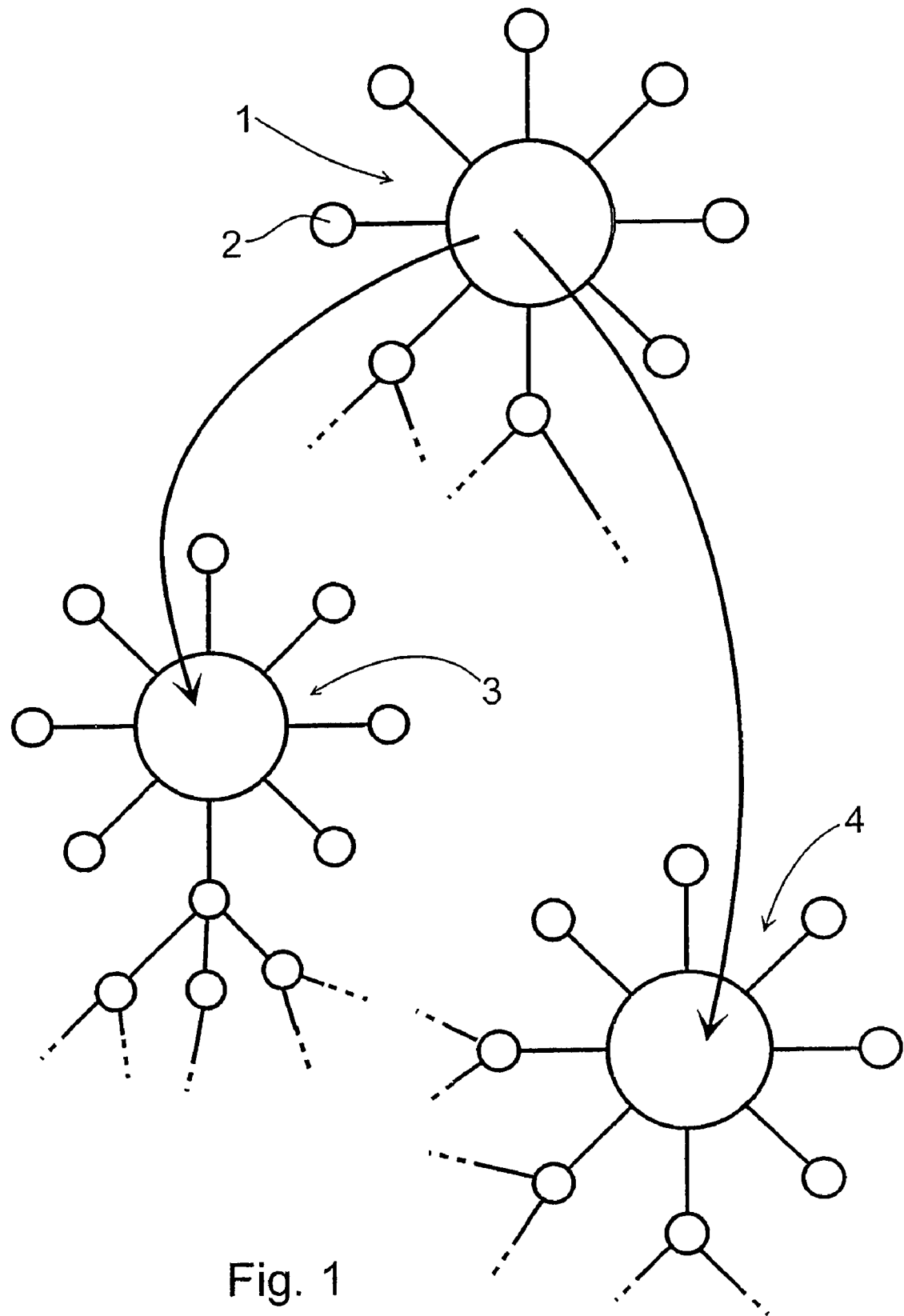
FIG. 1 shows an embodiment of the present invention.

FIG. 1 shows a first telecommunications network 1, which includes a multitude of switching centers 2 having a server and including software for implementing and organizing switching operations. These switching centers may be regionally assigned, for example. It may be provided here, for example, that telecommunications network 1 be completely organized via a certified center such as a center that is under the control of the government of a country. This center may be set up to notify affected population groups in case of an emergency.

If such a situation then occurs in which the regional group of people to be notified, for example, is so large that the switching capacity of the switching center usually provided for this purpose is no longer sufficient, the software of the figure may correspondingly be transmitted to other telecommunications networks 3 and 4, or software already there may be activated, the selected telecommunications networks or the switching centers available therein having a higher switching capacity, especially for this region. This ensures that sufficient switching capacity will always be achieved in such a situation, so that the required switching operations are able to be implemented within a minimum of time so as to transmit notifications, for instance.

Figure 2:
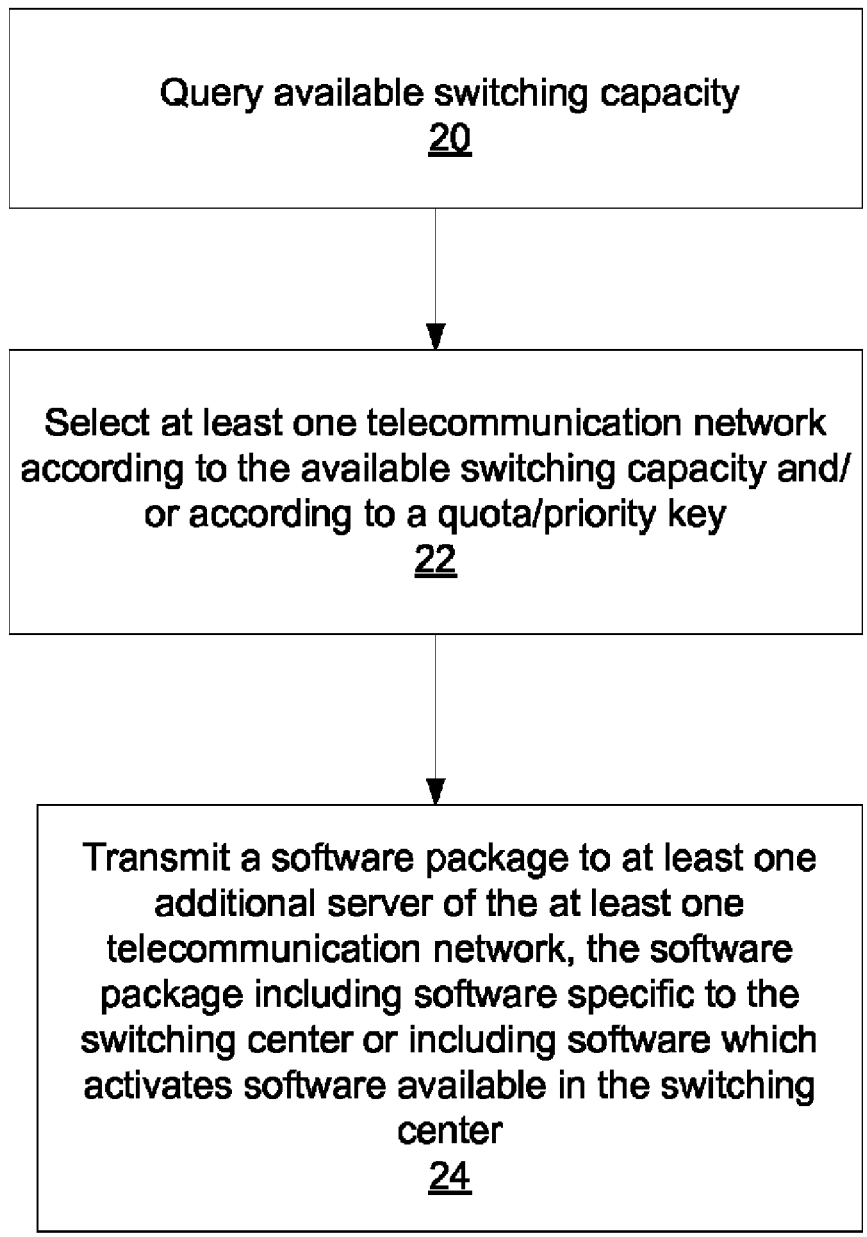
FIG. 2 shows an embodiment of a method according to the present invention.

FIG. 2 shows an exemplary embodiment of a method for operating and/or organizing at least one telecommunication network, having software for organizing and/or implementing the switching of telecommunication connections and/or services running in a central server of the at least one telecommunication network. In a situation in which there is insufficient switching capacity of the network-internal switching centers, software is intermittently transmitted to at least one additional server of at least one additional selectable telecommunication network and/or is activated therein at least intermittently. This, for example, may be implemented in order to increase the switching capacity. Such software runs on a plurality of services of different telecommunication networks simultaneously, or runs only on one server of a selected telecommunication network having sufficient switching capacity. Prior to the transmission/activation of software in a telecommunications network, its activity and/or the available switching capacities are/is queried 20. The selection 22 of at least one among a plurality of telecommunication networks is implemented according to the available switching capacity and/or according to a quota/priority key. For transmission/activation of software, at least one software package is transmitted 24 to at least one telecommunication network, by which software that is specific to the switching center is transmitted or by which software available in the switching center is activated.

What is claimed is:
1. A method for at least one of operating and organizing at least one telecommunication network, comprising:
   providing software for at least one of organizing and implementing at least one of a switching of telecommunication connections and services running in a central server of the at least one telecommunication network, in the event of insufficient switching of the network-internal switching centers, at least one of transmitting intermittently software to at least one additional server of at least one additional selectable telecommunication network and activating software therein at least intermittently in order to increase the switching capacity,
   wherein the event of insufficient switching capacity is observed with respect to at least one of time and duration;
   wherein for transmission/activation of software, at least one software package is transmitted to at least one telecommunication network, by which software that is specific to the switching center is transmitted or by which software available in the switching center is activated;
   wherein a number of software packages that corresponds to the number of the required switching centers is transmitted in order to obtain a required switching capacity, each software package implementing precisely one software transmission/activation, in particular.

2. The method as recited in claim 1, wherein one of software is running on a plurality of servers of different telecommunication networks simultaneously and software is running only on one server of a selected telecommunication network having sufficient switching capacity.

3. The method as recited in claim 1, wherein, prior to the transmission/activation of software in a telecommunication network, its activity and/or the available switching capacities are/is queried.

4. The method as recited in claim 1, wherein the selection of at least one among a plurality of telecommunication networks is implemented according to the available switching capacity and according to a quota/priority key.

5. The method as recited in claim 1, wherein a software package is a program or macro that continually retransmits copies of its own data and, in particular, includes a list of network addresses to be triggered.

6. The method as recited in claim 1, wherein, following a period of time, a de-installation/deactivation of the software in no longer required switching centers is implemented, in particular automatically or by renewed transmission of a software package.

7. The method as recited in claim 1, wherein software implements an automatic notification of at least one group of people of the population, in particular for an alert in dangerous situations, via a fixed network telephone, mobile telephone, the Internet, e-mail, web radio, in particular.

8. The method as recited in claim 1, wherein, at least prior to a transmission, software runs in a server of a certified trust center.

9. The method as recited in claim 1, wherein software for implementing switching operations accesses a portability database having network-spanning
    network identification codes of persons to be switched/notified, and/or having access to a database of a selected telecommunication network.

10. A system, for a telecommunications network having a server on which software for implementing and/or organizing switching operations is running,
    wherein, in the event of insufficient switching capacity of the switching centers of the own network, the software is transmittable, at least intermittently, to at least one additional server of at least one additional selectable telecommunication network, or software available on such a server is activatable at least intermittently to increase the switching capacity.

* * * * *